United States Patent
Takizawa (10) Patent No.: US 7,760,297 B2
(45) Date of Patent: Jul. 20, 2010

(54) TRANSFLECTIVE DISPLAY DEVICE HAVING THREE PRIMARY COLOR FILTERS AND AN ADDITIONAL COLOR FILTER FROM A COMPLEMENTARY COLOR SYSTEM

(75) Inventor: Keiji Takizawa, Azumino (JP)

(73) Assignee: Sony Corporation, Tokyo (JP)

( * ) Notice: Subject to any disclaimer, the term of this patent is extended or adjusted under 35 U.S.C. 154(b) by 470 days.

(21) Appl. No.: 11/436,760

(22) Filed: May 19, 2006

(65) Prior Publication Data

US 2006/0274235 A1 Dec. 7, 2006

(30) Foreign Application Priority Data

May 19, 2005 (JP) ............................. 2005-146426
Oct. 18, 2005 (JP) ............................. 2005-303255

(51) Int. Cl.
G02F 1/1335 (2006.01)
(52) U.S. Cl. ..................... 349/114; 349/106; 349/108; 349/113
(58) Field of Classification Search ......... 349/106–109, 349/114
See application file for complete search history.

(56) References Cited

U.S. PATENT DOCUMENTS

| 6,950,156 B1 | 9/2005 | Yoshida |
| 7,375,777 B2 | 5/2008 | Yoshida |
| 2003/0122998 A1 | 7/2003 | Iijima et al. |
| 2005/0018108 A1 | 1/2005 | Okumura et al. |
| 2005/0237450 A1 * | 10/2005 | Hu et al. .................. 349/108 |
| 2005/0243047 A1 * | 11/2005 | Asao ........................ 345/88 |
| 2006/0082704 A1 * | 4/2006 | Chu et al. ................ 349/106 |

FOREIGN PATENT DOCUMENTS

| EP | 1 279 996 A2 | 1/2003 |
| JP | A-2000-330102 | 11/2000 |
| JP | 2001306023 A * | 11/2001 |
| JP | A 2002-258029 | 9/2002 |
| JP | A-2005-62833 A1 | 3/2005 |
| WO | WO 2006/109567 A | 10/2006 |

* cited by examiner

Primary Examiner—David Nelms
Assistant Examiner—Jessica M Merlin
(74) Attorney, Agent, or Firm—K&L Gates LLP (57) ABSTRACT

An electro-optical device includes a plurality of sub-pixels each of which has a light transmitting region and a light reflecting region, colored layers being disposed so as to correspond to the plurality of sub-pixels, the colored layers having filter colors of a three primary color system and a filter color of a complementary color system other than the three-primary-color system, transmissive display being performed in the light transmitting region, reflective display being performed in the light reflecting region, and color display being performed in both reflective display and transmissive display. Further, in each of the plurality of sub-pixels, a colored layer of any one of the filter colors of the three primary color system and the filter color of the complementary color system other than the three primary color system is disposed in at least the light transmitting region, and the colored layer is not provided in the light reflective region of the sub-pixel in which the colored layer of the filter color of the complementary color system is disposed.

31 Claims, 7 Drawing Sheets

TRANSFLECTIVE DISPLAY DEVICE HAVING THREE PRIMARY COLOR FILTERS AND AN ADDITIONAL COLOR FILTER FROM A COMPLEMENTARY COLOR SYSTEM

This application claims the benefit of Japanese Patent Application No. 2005-146426, filed May 19, 2005, and Japanese Patent Application No. 2005-303255, filed Oct. 18, 2005. The entire disclosures of the prior applications are hereby incorporated by reference herein in their entirety.

BACKGROUND

1. Technical Field

The invention relates to an electro-optical device and an electronic apparatus, and more particularly, to an electro-optical device which includes a color filter having a plurality of colored layers and allows both reflective display and transmissive display of colors to be implemented by the color filter.

2. Related Art

In general, a color filter is provided for allowing color display to be performed in a liquid crystal display (LCD) or other various electro-optical devices. This color filter is, for example, formed such that a plurality of, different colored layers, such as, red, green, and blue colored layers, are respectively disposed in every pixel and the plurality of colored layers are arranged in a predetermined pattern. Such colored layers are formed, for example, by a photolithography method using a photosensitive resin containing colorant (e.g., pigment, dye, or the like).

In the meantime, there is a known display device, which has a backlight disposed at the rear side of the electro-optical device to display the visible transmission by using lights of the backlight in a relatively dark environment such as indoors or in the car, and turns off the backlight to display visible reflection by using external lights in a bright location such as outdoors. In this type of device, a transmitting region allowing lights to be transmitted and a reflecting region allowing lights to be reflected are formed within each pixel, and the transmissive display is utilized by using the transmitting region and the reflective display is utilized by using the reflecting region.

In this case, the colored layer needs to be formed at both sides of the transmitting and reflecting regions in order to utilize the color display at both sides thereof, however, lights from the backlight transmit the colored layer in the transmitting region only once whereas external light transmit the colored layer twice by going and returning, such that bright display is possible at the expense of saturation in the transmissive display, and it is easy to increase the saturation at the expense of bright display in the reflective display. Accordingly, the colored layer in the transmitting region generally needs to have higher saturation than the colored layer of the reflecting region.

In order to have colored layers with different saturations from each other in the transmitting and reflecting regions, an amount of colorants contained in the colored layer should be changed, such that the different kinds of the colored layers cause a manufacture process thereof to be complicated. Here, there is a well-known color filter for an LCD. The color filter has colored layers with two colors stacked sequentially in the transmitting region among three complementary colors of cyan, magenta, and yellow while having each of the two colors disposed as a single layer in the reflecting region in order to form three primary colors of red, green, and blue colors such that a saturation for the transmissive display can be secured and a brightness of the reflective display can be obtained (for example, see JP-A-2002-258029).

However, in the electro-optical device which allows both the transmissive display and the reflective display to be utilized, a substantial aperture ratio of the transmissive display decreases due to the formation of the reflecting region while a substantial aperture ratio of the reflective display simultaneously decreases due to the formation of the transmitting region, such that it is difficult to secure display brightness and utilize a visual balance between both reflective display and transmissive display.

In particular, a luminance or a contrast of the reflective display is originally and significantly lower than a luminance or a contrast of the transmissive display, such that the reflecting region is given priority so as to secure brightness whereas a high display quality (e.g., a contrast, color reproducibility, or the like) is required for the transmissive display. Thus, it is necessary to improve the quality of the color filter in the transmitting region having a limited area in order to improve the display quality of the transmissive display. However, when the colored layers of the reflecting and transmitting regions are formed of different materials to perform high quality transmissive display, the number of process steps of manufacturing the color filter increases, which causes an increase in manufacturing cost.

SUMMARY

An advantage of some aspects of the invention is that it provides a color filter structure capable of easily securing high quality display of transmissive and reflective display and a balance therebetween by differing a color element of the transmissive display from a color element of the reflective display so as to utilize color display of the transmissive and reflective display, and an electro-optical device having the same.

According to a first aspect of the invention, an electro-optical device includes a plurality of sub-pixels each of which has a light transmitting region and a light reflecting region, colored layers being disposed so as to correspond to the plurality of sub-pixels, the colored layers having filter colors of a three primary color system and a filter color of a complementary color system other than the three primary color system, transmissive display being performed in the light transmitting region, reflective display being performed in the light reflecting region, and color display being performed in both the reflective display and the transmissive display. In each of the plurality of sub-pixels, a colored layer of any one of the filter colors of the three primary color system and the filter color of the complementary color system other than the three primary color system is disposed in at least the light transmitting region, and the colored layer is not provided in the light reflective region of the sub-pixel in which the colored layer of the filter color of the complementary color system is disposed.

According to this configuration, the transmissive display can be implemented by the colored layers of the three colors of a primary color system and the filter color of the complementary color system disposed in the light transmitting regions, and thus a color reproducibility range of the transmissive display is broadened, which results in improvement of color reproducibility of the color display of the transmissive display. In addition, the brightness of the reflective display is improved by the light reflecting region where the colored layer in the sub-pixel corresponding to the filter color of the complementary color system is not disposed while ensuring the sufficient color reproducibility of the reflective display by the filter colors of the three colors of the primary color system. That is, the improvement of the color reproducibility of the transmissive display and the improvement of the brightness of the reflective display can be simultaneously implemented, which results in constructing a high-definition electro-optical device as a whole.

Preferably, in each of the plurality of sub-pixels, an area of the light transmitting region of the sub-pixel where the colored layer of the filter color of the primary color system of the three colors is disposed is the same as an area of the light transmitting region of the sub-pixel where the colored layer of the filter color of the complementary color system is disposed. According to this configuration, the light transmitting regions of the sub-pixels of at least four kinds can have the same area as each other, and thus it is possible to easily control the color display by the colored layers of at least four colors in the transmissive display.

Preferably, in each of the plurality of sub-pixels, an area of the light reflecting region of the sub-pixel where the colored layer of the filter color of the primary color system of the three colors is disposed is the same as an area of the light reflecting region of the sub-pixel where the colored layer of the filter color of the complementary color system is disposed, in which the colored layer is not provided. According to this configuration, the light reflecting regions of the sub-pixels of at least four kinds may have the same area as each other, and it is possible to easily perform the control of the color display in the reflective display. In particular, the brightness of the reflective display can be adjusted by controlling the light reflecting region where the colored layer is not disposed.

Preferably, in each of the plurality of sub-pixels, an area of the sub-pixel where the colored layer of the filter color of the primary color system of the three colors is disposed is the same as an area of the sub-pixel where the colored layer of the filter color of the complementary color system is disposed. According to this configuration, since the sub-pixels of at least four kinds constituting the display unit have the same area as each other, the specific pixel arrangement does not need to be used, and a conventional general arrangement structure can be used as it is.

Preferably, in a sub-pixel where the colored layer of the filter color of the primary color system of the three colors is disposed, at least one sub-pixel is included in which a portion where the colored layer is not formed in the light reflecting region of the corresponding sub-pixel is provided. According to this configuration, the portion where the colored layer is not formed is provided in at least one of the three kinds of light reflecting regions where the colored layers are disposed, the brightness of the reflective display can be further ensured. In addition, even though the saturation of the colored layer is not lowered or the area of the light reflecting region is not increased, the brightness of the reflective display can be sufficiently ensured. Therefore, the saturation of the colored layer can be improved or the area of the light transmitting region can be increased, which results in improving quality of the transmissive display.

Preferably, the filter color of the complementary color system is cyan. According to this configuration, it is possible to further broaden a color reproducibility range of the transmissive display.

According to a second aspect of the invention, an electro-optical device includes three sub-pixels corresponding to three colors each of which has a light transmitting region and a light reflecting region, and in which a colored layer of any one of the three colors is disposed in each of the light transmitting region and the light reflecting region, and at least one sub-pixel in which a colored layer of one color other than the three colors is disposed in the light transmitting region, transmissive display is performed in the light transmitting region, reflective display is performed in the light reflecting region. Further, the at least one sub-pixel has a light reflecting region in which the colored layer is not disposed.

According to this configuration, in the three kinds of sub-pixels, the colored layer is provided in each of the light transmitting region and the light reflecting region, the reflective display may be allowed to perform color display by the three colors of colored layers. In the meantime, the light transmitting region where a colored layer of at least one color other than the three colors is disposed is provided in the at least one kind of sub-pixel, so that the transmissive display can be represented with at least four colors, which results in obtaining the high color reproducibility. As a result, the quality of the transmissive display can be improved, and the balance between the transmissive display and the reflective display can be improved. In particular, the transmissive display can be represented with at least four colors, and thus even though the saturation of each color is not improved, the wide range of colors can be reproduced. Therefore, the three kinds of colored layers constituting the reflective display can be set to the proper saturation while obtaining the brightness of the reflective display. In addition, the reflective display can be constructed with the light reflecting regions of the sub-pixels of at least four kinds, and the colored layer is not disposed in the light reflecting region of the at least one kind of sub-pixel. Even though the saturation of the colored layer is not lowered, the brightness of the reflective display can be sufficiently ensured. Accordingly, even when the colored layers of the three colors becoming the base are constructed with the common colored materials in the light transmitting region and the light reflecting region, it is possible to ensure the balance between the color reproducibility of the transmissive display and the brightness of the reflective display.

Preferably, the light transmitting region of each of the three sub-pixels corresponding to the three colors and the at least one sub-pixel has the same area. According to this configuration, the light transmitting regions of the at least four kinds of sub-pixels have the same area as each other, and the control of the color display by the colored layers of the at least four colors can be easily performed in the transmissive display.

Preferably, the light reflecting region of each of the three sub-pixels corresponding to the three colors and the at least one sub-pixel has the same area. According to this configuration, the light reflective regions of the at least four kinds of sub-pixels have the same area as each other, and the control of the color display can be easily performed in the reflective display. In particular, the brightness of the reflective display can be adjusted by controlling the light reflecting region where the colored layer is not disposed.

Preferably, the three sub-pixels corresponding to the three colors are the same as the at least one sub-pixel in an area. According to this configuration, since the sub-pixels of the at least four kinds constituting the display unit are the same as each other in an area, the specific pixel arrangement does not need to be used, and thus the conventional general arrangement structure can be used as it is.

Preferably, in at least one of the light reflecting regions of the three sub-pixels corresponding to the three colors, a portion is provided in which the colored layer is not provided. According to this configuration, the portion where the colored layer is not formed is provided in the at least one of the three kinds of light reflecting regions where the colored layers are disposed, and the bright of the reflective layer can be further improved. Even though the saturation of the colored layer is not lowered or the area of the light reflecting region is not increased, the brightness of the reflective display can be sufficiently ensured, and thus the improvement of the saturation of the colored layer or the increase in the area of the light transmitting region can be implemented, which results in improving the quality of the transmissive display.

Preferably, the three colors are filter colors of a primary color system, and the color other than the three colors is a filter color of a complementary color system. According to this configuration, at least one color of the filter colors of the complementary color system is added to the filter colors of the primary color system, and thus the color reproducibility of the color display can be further improved. In this case, in a state in which the color reproducibility range is broaden, the color other than the three colors is preferably cyan.

According to a third aspect of the invention, an electro-optical device includes a plurality of sub-pixels each of which has a light transmitting region and a light reflecting region, colored regions being disposed so as to correspond to the plurality of sub-pixels, the colored regions having, among a visible light region where hues vary in accordance with a wavelength, a first colored region of a blue hue, a second colored region of a red hue, and third and fourth colored regions each of has two kinds of different hues selected from hues from blue to yellow, transmissive display being performed in the light transmitting region, reflective display being performed in the light reflecting region, color display being performed in both the reflective display and the transmissive display. Further, in each of the plurality of sub-pixels, any one of the first to fourth colored regions is disposed in at least the light transmitting region, and the colored region is not provided in the light reflecting region of the sub-pixel in which either the third colored region or the fourth colored region is disposed.

According to this configuration, the transmissive display can be implemented by the four colors of the colored regions which are disposed in the light transmitting regions, the color reproducibility range of the transmissive display can be broadened, and the color reproducibility of the color display of the transmissive display can be improved. In addition, while the sufficient color reproducibility of the reflective display can be ensured by the filter colors of the three colors among the four colors, the bright of the reflective display can be improved by the light reflecting region where the colored layer in the sub-pixel corresponding to the filter color of the remaining color is not disposed. That is, the improvement of the color reproducibility of the transmissive display and the improvement of the brightness of the reflective display can be simultaneously implemented, which results in constructing a high-definition electro-optical device as a whole.

According to a fourth aspect of the invention, An electro-optical device includes a plurality of sub-pixels each of which has a light transmitting region and a light reflecting region, colored regions being disposed so as to correspond to the plurality of sub-pixels, the colored regions having a first colored region in which a peak of a wavelength of light transmitted through the corresponding colored region is within a range of 415 to 500 nm, a second colored region in which a peak of a wavelength of light transmitted through the corresponding colored region is 600 nm or more, a third colored region in which a peak of a wavelength of light transmitted through the corresponding colored region is within a range of 485 to 535 nm, and a fourth colored region in which a peak of a wavelength of light transmitted through the corresponding colored region is within a range of 500 to 590 nm, transmissive display being performed in the light transmitting region, reflective display being performed in the light reflecting region, color display being performed in both the reflective display and the transmissive display. Further, in each of the plurality of sub-pixels, any one of the first to fourth colored regions is disposed in at least the light transmitting region, and the colored region is not provided in the light reflecting region of the sub-pixel in which either the third colored region or the fourth colored region is disposed. In this case, preferably, the third colored region is a colored region in which a peak of a wavelength of light transmitted through the corresponding colored region is within a range of 495 to 520 nm, and the fourth colored region is a colored region in which a peak of a wavelength of light transmitted through the corresponding colored region is within a range of 510 to 585 nm.

According to this configuration, the transmissive display can be implemented by the four colors of the colored regions which are disposed in the light transmitting regions, the color reproducibility range of the transmissive display can be broadened, and the color reproducibility of the color display of the transmissive display can be improved. In addition, while the sufficient color reproducibility of the reflective display can be ensured by the filter colors of the three colors among the four colors, the bright of the reflective display can be improved by the light reflecting region where the colored layer in the sub-pixel corresponding to the filter color of the remaining color is disposed. That is, the improvement of the color reproducibility of the transmissive display and the improvement of the brightness of the reflective display can be simultaneously implemented, which results in constructing a high-definition electro-optical device as a whole.

Preferably, in each of the plurality of sub-pixels, an area of the light transmitting region of each of the sub-pixels where the first colored layer, the second colored layer, and one of the third colored layer and the fourth colored layer are disposed is the same as an area of the light transmitting region of the sub-pixel where the other of the third colored region and the fourth colored region is disposed. According to this configuration, the light transmitting regions of the at least four kinds have the same area as each other, and in the transmissive display, the control of the color display by the colored regions of at least four colors can be easily performed.

Preferably, in each of the plurality of sub-pixels, an area of the light reflecting region of each of the sub-pixels where the first colored layer, the second colored layer, and one of the third colored layer and the fourth colored layer are disposed is the same as an area of the light reflecting region of the sub-pixel where the other of the third colored region and the fourth colored region is disposed. According to this configuration, the light transmitting regions of the at least four kinds have the same area as each other, and in the reflective display, the control of the color display can be easily performed. In particular, the brightness of the reflective display can be adjusted by the controlling the light reflecting region where the colored layer is not disposed.

Preferably, in each of the plurality of sub-pixels, an area of each of the sub-pixels where the first colored layer, the second colored layer, and one of the third colored layer and the fourth colored layer are disposed is the same as an area of the sub-pixel where the other of the third colored region and the fourth colored region is disposed. According to this configuration, since the sub-pixels of the at least four kinds constituting the display unit has the same area as each other, the specific pixel arrangement does not need to be used, and the conventional general arrangement structure can be used as it is.

Preferably, in the light reflecting region of the sub-pixel where the first colored region, the second colored region, and one of the third colored layer and the fourth colored layer are disposed, at least one sub-pixel is included in which a portion where the colored region is not formed is provided. According to this configuration, the portion where the colored region is not formed is provided on the at least one of the three kinds of the light reflecting regions disposed in the colored regions, and the brightness of the reflective display can be further ensured. Even though the saturation of the colored layer is not lowered or the area of the light reflecting region is not increased, the brightness of the reflective display can be sufficiently ensured, and thus the improvement of the saturation of the colored layer or the increase in the area of the light transmitting region can be implemented, which results in improving the quality of the transmissive display.

According to a fifth aspect of the invention, an electro-optical device includes three sub-pixels corresponding to three colors each of which has a light transmitting region and a light reflecting region, and in which a colored layer of any one of the three colors is disposed in each of the light transmitting region and the light reflecting region, and at least one sub-pixel in which a colored region of one color other than the three colors is disposed in the light transmitting region, transmissive display being performed in the light transmitting region, reflective display being performed in the light reflecting region. Further, the at least one sub-pixel has a light reflecting region in which the colored layer is not disposed.

According to this configuration, in the three kinds of sub-pixels, the colored layer is provided in each of the light transmitting region and the light reflecting region, the reflective display may be allowed to perform color display by the three colors of colored layers. In the meantime, the light transmitting region where a colored layer of at least one color other than the three colors is disposed is provided in the at least one kind of sub-pixel, so that the transmissive display can be represented with at least four colors, which results in obtaining the high color reproducibility. As a result, the quality of the transmissive display can be improved, and the balance between the transmissive display and the reflective display can be improved. In particular, the transmissive display can be represented with at least four colors, and thus even though the saturation of each color is not improved, the large range of colors can be reproduced. Therefore, the three kinds of colored layers constituting the reflective display can be set to the proper saturation while obtaining the brightness of the reflective display. In addition, the reflective display can be constructed with the light reflecting regions of the sub-pixels of at least four kinds, and the colored layer is not disposed in the light reflecting region of the at least one kind of sub-pixel. Even though the saturation of the colored layer is not lowered, the brightness of the reflective display can be sufficiently ensured. Accordingly, even when the colored layers of the three colors becoming the base are constructed with the common colored materials in the light transmitting region and the light reflecting region, it is possible to ensure the balance between the color reproducibility of the transmissive display and the brightness of the reflective display.

Preferably, the light transmitting region of each of the three sub-pixels corresponding to the three colors and the at least one sub-pixel has the same area. According to this configuration, the light transmitting regions of the at least four kinds of sub-pixels have the same area as each other, and the control of the color display by the at least four colors can be easily performed in the transmissive display.

Preferably, the light transmitting region of each of the three sub-pixels corresponding to the three colors and the at least one sub-pixel has the same area. According to this configuration, the light transmitting regions of the at least four kinds of sub-pixels have the same area as each other, and the control of the color display can be easily performed in the reflective display. In particular, the brightness of the reflective display can be adjusted by controlling the light reflecting region where the colored region is not disposed.

Preferably, the light reflecting region of each of the three sub-pixels corresponding to the three colors and the at least one sub-pixel has the same area. According to this configuration, since the sub-pixels of the at least four kinds constituting the display unit are the same as each other in an area, the specific pixel arrangement does not need to be used, and thus the conventional general arrangement structure can be used as it is.

Preferably, in at least one of the light reflecting regions of the three sub-pixels corresponding to the three colors, a portion is provided in which the colored layer is not provided. According to this configuration, the portion where the colored layer is not formed is provided in the at least one of the three kinds of light reflecting regions where the colored layers are disposed, and the bright of the reflective display can be further improved. Even though the saturation of the colored region is not lowered or the area of the light reflecting region is not increased, the brightness of the reflective display can be sufficiently ensured, and thus the improvement of the saturation of the colored layer or the increase in the area of the light transmitting region can be implemented, which results in improving the quality of the transmissive display.

Preferably, the colored regions corresponding to the three colors are among a visible light region where hues vary in accordance with a wavelength, a colored region of a blue color, a colored region of a red color, and one of colored regions of two kinds of different colors selected from hues from blue to yellow, and the colored region corresponding to the color other than the three colors is the other of the colored regions of two kinds of different hues selected from hues from blue to yellow. By adding one color other than the three colors, the color reproducibility of the color display can be further improved. In this case, in addition to broadening the color reproducibility range, it is effective that the colored regions of the two kinds of hues which are selected from hues from the blue to the yellow are respectively a colored region of hues from blue to green and a colored region from green to orange.

Preferably, the colored regions corresponding to the three colors are a first colored region in which a peak of a wavelength of light transmitted through the colored region is within a range of 415 to 500 nm, a second colored region in which a peak of a wavelength of light transmitted through the colored region is 600 nm or more, and one of a third colored region in which a peak of a wavelength of light transmitted through the colored region is within a range of 485 to 535 and a fourth colored region in which a peak of a wavelength of light transmitted through the colored region is within a range of 500 to 590, and the colored region corresponding to the colors other than the three colors is the other of the third colored region and the fourth colored region. By adding a new color other than the three colors, the color reproducibility of the color display can be further improved. In this case, in addition to the broadening the color reproducibility range, it is effective that the third colored region is a colored region in which a peak of a wavelength of light transmitted through the colored region is within a range of 495 to 520 nm, and the fourth colored region is a colored region in which a peak of a wavelength of light transmitted through the colored region is within a range of 510 to 585 nm.

According to a sixth aspect of the invention, an electronic apparatus includes the above-described electro-optical device, and a control unit which controls the electro-optical device. According to this configuration, the electro-optical device can achieve the transmissive display and the reflective display, and can have high responsibility with respect to the variation of the external environment. Accordingly, when the electro-optical device is mounted in a cellular phone, a significant effect can be obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
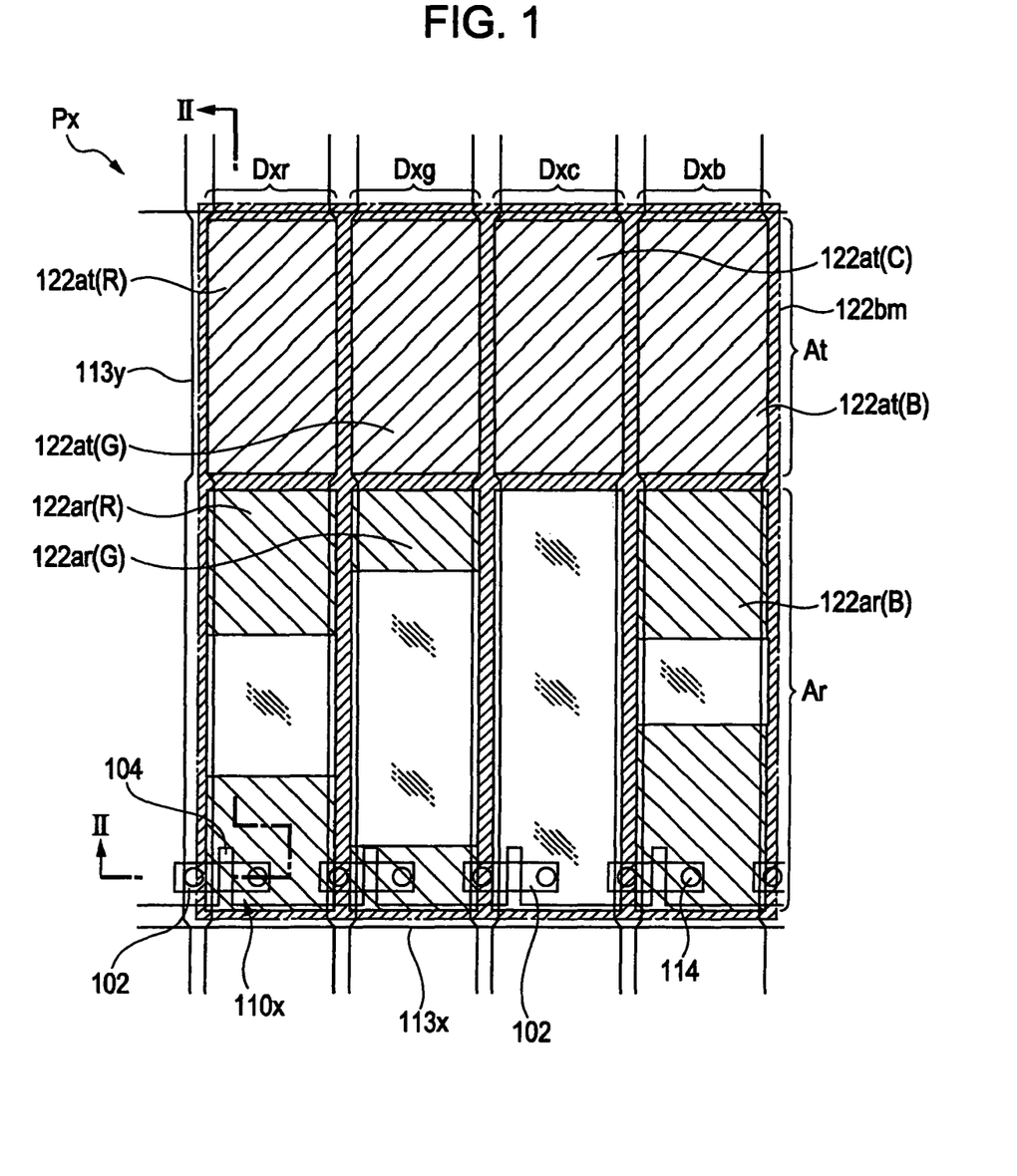
FIG. 1 is a plan view schematically illustrating a structure of one pixel in an electro-optical device according to a first embodiment of the invention.
Figure 2:
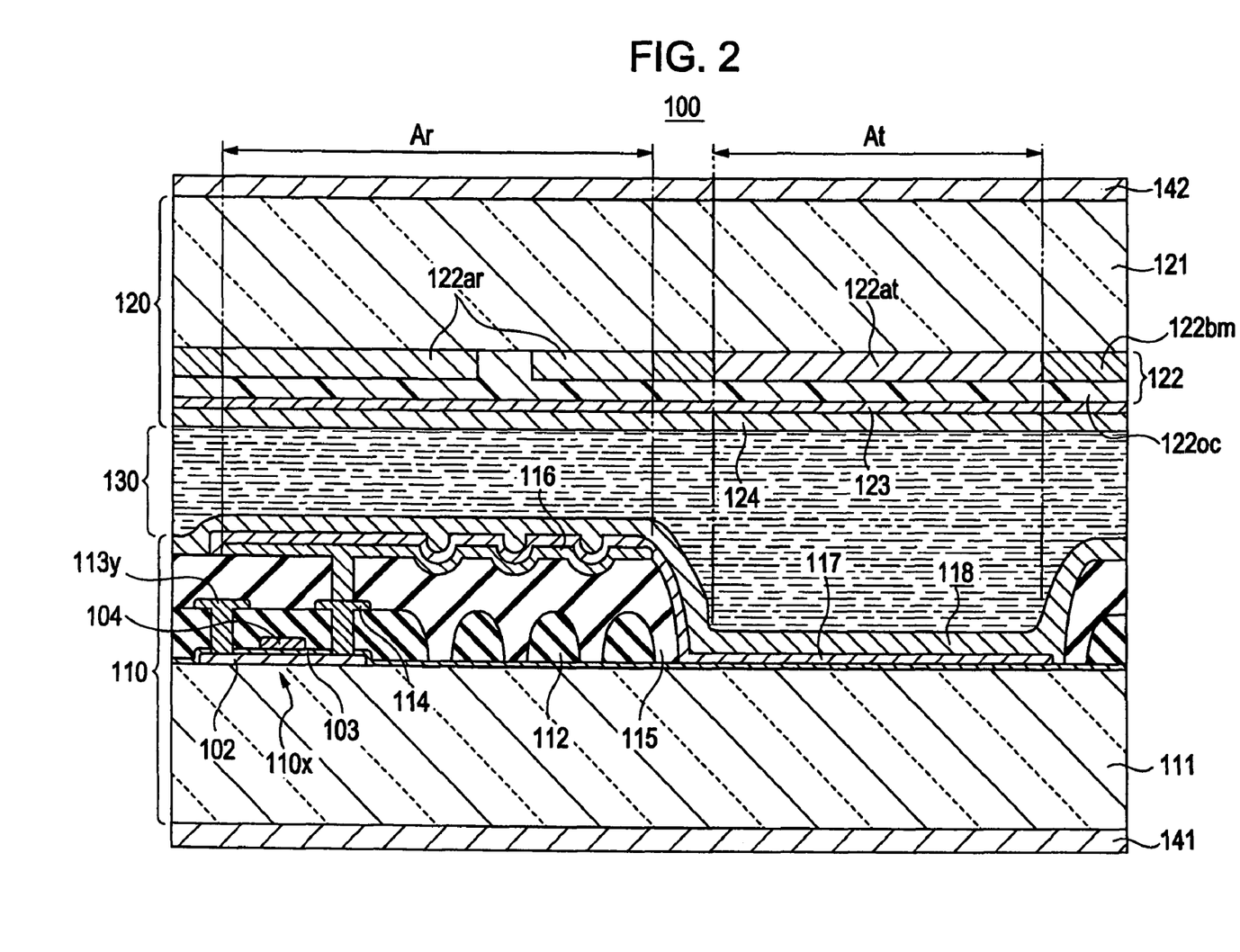
FIG. 2 is a longitudinal cross-sectional view schematically illustrating a sectional structure of one sub-pixel in the electro-optical device according to the first embodiment of the invention.

Hereinafter, preferred embodiments of the invention will be described in detail with reference to the accompanying drawings. FIG. 1 is an enlarged perspective plan view illustrating an internal structure of a display unit (pixel) of the pixel arrangement in an electro-optical device according to the first embodiment of the invention. FIG. 2 is an enlarged longitudinal cross-sectional view illustrating a sectional structure of one pixel in the same electro-optical device.

This embodiment illustrates a liquid crystal device that is a kind of the electro-optical device. As shown in FIG. 2, a base 110 and a base 120 are bonded to each other through a sealant (not shown) at a predetermined gap, and a liquid crystal layer 130 is disposed between the base 110 and the base 120.

The base 110 includes a transparent substrate 111 that is made of glass or plastic. A TFT (switching element) 110X is formed on an inner surface of the substrate 111. The TFT 110X includes a semiconductor layer 102 that is formed of a polysilicon layer or the like, a gate insulating film 103 that is formed on the semiconductor layer 102, and a gate electrode 104 that is opposite to a channel region of the semiconductor layer 102 with the gate insulating film 103 interposed therebetween. The gate electrode 104 is electrically connected to a scanning line 113x shown in FIG. 1.

An interlayer insulating layer 112 formed of a silicon oxide or the like is formed thereon, and the interlayer insulating layer 112 covers the TFT 110X and has small unevenness that is formed on a surface thereof by means of a photolithography method. A data line 113y electrically connected to a source region of the semiconductor layer 102, and a connection electrode 114 electrically connected to a drain region of the semiconductor layer 102 are disposed on the interlayer insulating layer 112.

An interlayer insulating layer 115 formed of a silicon oxide or the like is further disposed thereon, and a reflective layer 116 formed of metal such as aluminum or a reflective conductor is disposed on the interlayer insulating layer 115. The reflective layer 116 is electrically connected to the connection electrode 114. The reflective layer 116 has a scattering reflective surface having a small unevenness that reflects the shape of the surface unevenness of the interlayer insulating layer 112. The reflective layer 116 has an island shape in a sub-pixel so as to correspond to a light reflecting region Ar provided in one sub-pixel. A light transmitting region At is formed in the sub-pixel, in addition to the reflecting region Ar, and the reflective layer 116 is not disposed in the light transmitting region At.

An electrode 117 formed of a transparent conductor such as an ITO (Indium Tin Oxide) is disposed on the reflective layer 116, and the electrode 117 is disposed over the entire display range of the sub-pixel, that is, the electrode 117 is disposed to cover both the light transmitting region At and the light reflecting region Ar. The electrode 117 is electrically connected to the drain region of the TFT 110X through the reflective layer 116. In addition, according to this embodiment, since the reflective layer 116 functions as a reflecting electrode, the electrode 117 becoming a transparent electrode may not need to be disposed in a region covering the entire reflective layer 116 (light reflecting region) and a part of the electrode 117 becoming a transparent electrode may be partially laminated on the reflective layer 116 so as to be electrically connected to each other.

An alignment film 118 formed of a polyimide resin or the like is disposed on the above-described structure. The alignment film 118 functions to initially align liquid crystal molecules within the liquid crystal layer 130, and is formed by covering an uncured resin, curing the resin by means of burning or the like, and performing a rubbing process.

In the meantime, the base 120 includes a transparent substrate 121 formed of glass or plastic, and a color filter 122 is disposed on an inner surface of the substrate 121. The color filter 122 has a colored layer 122at disposed in the light transmitting region At and a colored layer 122ar disposed in the light reflecting region Ar. Each of the colored layers 122at and 122ar has any one of red, green, and blue which are filter colors of a primary color system to be described below. The colored layer 122at and the colored layer 122ar within the same sub-pixel basically have the same color, however, may have different hues (color density, chromaticity, saturation) or different light transmittance. In this embodiment, the colored layers 122at and 122ar within the same sub-pixel are simultaneously formed of the same colored material and have the same hue and light transmittance.

The color filter 122 has a light shielding layer 122bm formed of a black resin or the like between sub-pixels, between pixels, or between the light transmitting region At and the reflecting region Ar. The light shielding layer 122bm functions to shield regions where liquid crystal molecules are not desirably aligned due to an inclined electric field occurring on the edges of electrodes 117 and 123 or step difference of the base 110 or the base 120 so as to prevent a contrast from being degraded due to optical leakage.

In addition, a protective film 122oc formed of an acrylic resin or the like is disposed on the colored layers 122at and 122*ar* and the light shielding layer 122*bm*. The protective film 122*oc* planarizes the surface of the color filter 122 while simultaneously preventing impurities from penetrating into the colored layers 122*at* and 122*ar*, which may cause deterioration.

The electrode 123 formed of a transparent conductor such as an ITO is disposed on the color filter 122, and an alignment film 124 is disposed on the electrode 123. In this embodiment, the TFT 110X is a three-terminal switching element (i.e., a nonlinear element), such that the electrode 117 is a pixel electrode separated from every sub-pixel, and the electrode 123 is a common electrode disposed over a plurality of sub-pixels (and a plurality of pixels) (preferably, over the entire device). However, when a two-terminal switching element (nonlinear element) is used instead of the TFT 110X, the counter electrode 123 extends in a direction crossing the data line 113, and has a stripe shape where a plurality of stripes are arranged in the extending direction of the data line 113.

The liquid crystal layer 130 is a liquid crystal layer of a twisted nematic (TN) mode using nematic liquid crystal or a super TN (STN) mode, and is formed in cooperation with polarization plates 141 and 142 disposed on outer sides of the bases 110 and 120 to control light transmittance per sub-pixel. In this embodiment, the thickness of the liquid crystal layer 130 in the light transmitting region At is set to be greater than a thickness of the liquid crystal layer 130 in the light reflecting region Ar (e.g., about two times), so as to prevent a large difference between depth of modulation of the liquid crystal layer 130 in the transmissive display using the light transmitting region At and depth of modulation of the liquid crystal layer 130 in the reflective display using the reflecting region Ar.

In this embodiment, in accordance with presence of the interlayer insulating layers 112 and 115, the difference of thickness between the liquid crystal layer 130 in the light transmitting region At and the liquid crystal layer 130 in the light reflecting region Ar is secured. However, an insulating layer may be formed on the color filter 122 so as to secure the difference of thickness between the light transmitting region At and the light reflecting region Ar of the liquid crystal layer 130 in accordance with presence of the insulating layer.

In this embodiment, the pixel Px shown in FIG. 1 is a basic unit for constituting a minimum unit of a display image, has a rectangular and planar shape, and is composed of four kinds of sub-pixels Dxr, Dxg, Dxc, Dxb. The sub-pixel described herein is a minimum control unit capable of independently controlling light transmittance to each other, and a plurality of the sub-pixels is collected to constitute the pixel Px. Accordingly, the number of the sub-pixels constituting the pixel Px is not generally limited to four. However, the number of the sub-pixels constituting the pixel Px may be an arbitrary number which is greater than or equal to four in this embodiment. In addition, the 'colored region' described herein is a region where each of the colored layers 122*ar* and 122*at* is formed, and corresponds to each of the sub-pixels Dxr, Dxg, Dxc, and Dxb. The four colored regions are included in one pixel PX.

A structure of the pixel shown in FIG. 2 shows structures of the three sub-pixels Dxr, Dxg, and Dxb among the four sub-pixels, and correspond to colored layers of R (red), G (green), and B (blue) which are the filter colors of the primary color system of the three colors. It is common that the light transmitting region At and the light reflecting region Ar are disposed in each structure of the three sub-pixels and the colored layers 122*at* and 122*ar* of R (red), G (green), and B (blue) are disposed in the regions At and Ar in each of the three sub-pixels as described above. In addition, area ratios between the light transmitting region At and the light reflecting region Ar are almost the same as each other in the three sub-pixels Dxr, Dxg, and Dxb.

The colored layer 122*at* is disposed over an entire surface of the light transmitting region At in the three sub-pixels Dxr, Dxg, and Dxb. That is, the light transmitting region At of each of the three sub-pixels is entirely covered by the colored layers of primary colors R (red), G (green), and B (blue). In the meantime, the colored layer 122*ar* is selectively disposed on a portion of the corresponding region in the light reflecting region Ar in the drawing. That is, the light reflecting region Ar is not colored by the reflective layer 116 but has a non-colored region where light is reflected. In addition, an occupied area ratio of the colored layer 122*ar* within the light reflecting region Ar is different from each other in the sub-pixels Dxr, Dxg, and Dxb. However, the colored layer 122*ar* may be formed to cover at least one of the reflecting regions Ar of the three sub-pixels.

In the meantime, in the sub-pixel Dxc, the light transmitting region At and the light reflecting region Ar are provided. In the drawing, an area ratio between the light transmitting region At and the light reflecting region Ar of the sub-pixel Dxc is the same as those of the three kinds of sub-pixels Dxr, Dxg, and Dxb. However, the area ratio between the light reflecting region Ar and the light transmitting region At of the sub-pixel Dxc may be different from those of the three kinds of sub-pixels Dxr, Dxg, and Dxb.

In the sub-pixel Dxc of this embodiment, similar to the other three kinds of sub-pixels, the colored layer 122*at* is disposed in the light transmitting region At. The color of the colored layer 122*at* is cyan which is a filter color of the complementary color system. However, unlike the three sub-pixels Dxr, Dxg, and Dxb, in the light reflecting region Ar of the sub-pixel Dxc, the colored layer is not provided. That is, in the light reflecting region Ar of the sub-pixel Dxc, the entire reflecting region 116 is not covered with the colored layer so as to be exposed to the outside.

Figure 5:
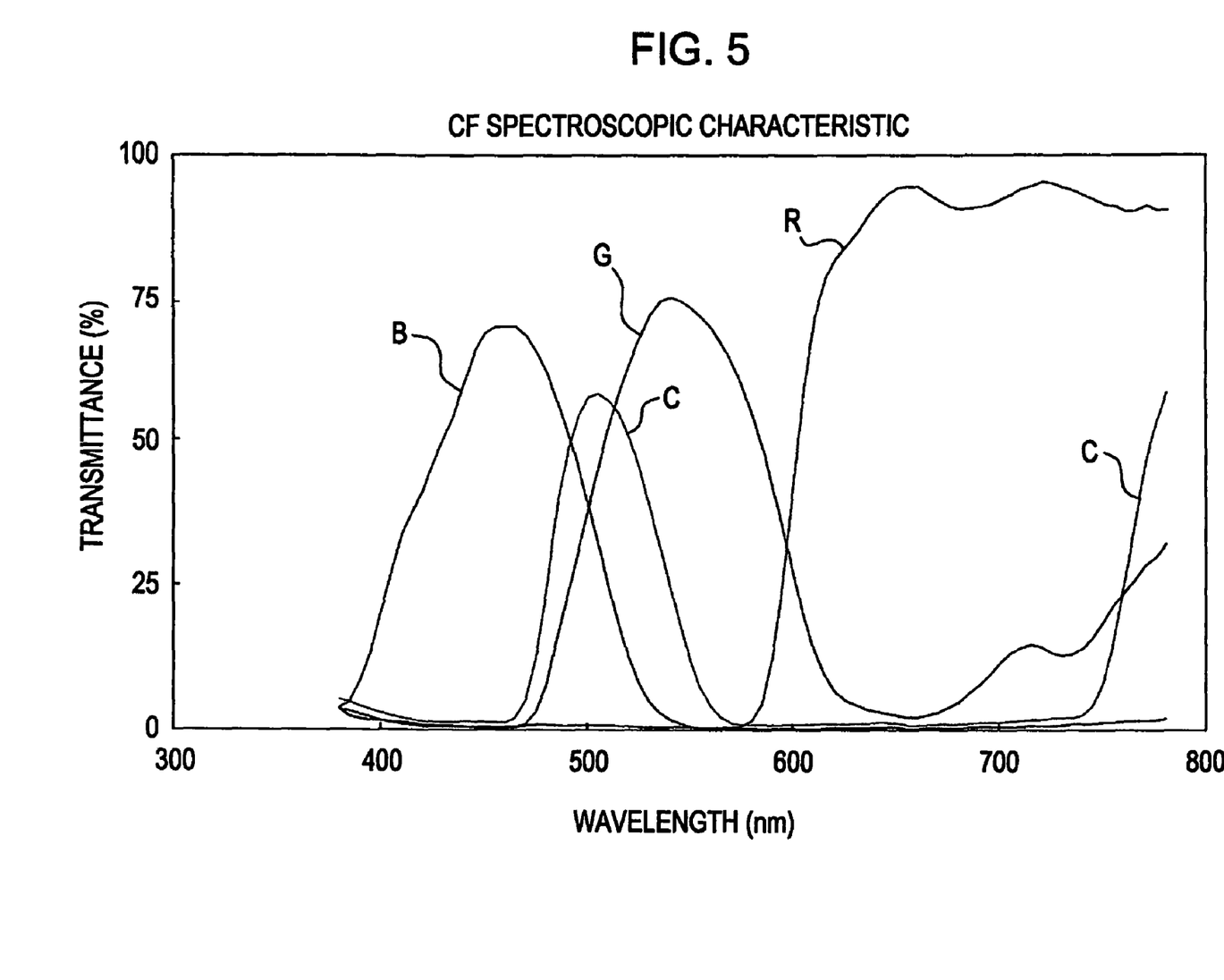
FIG. 5 is a diagram illustrating a spectroscopic spectrum of each of colored layers in accordance with the embodiments.

FIG. 5 is a diagram illustrating a spectroscopic spectrum of a colored material of each of the colored layers 122*at* and 122*ar* of the color filter 122 employed in this embodiment. Referring to the drawing, light transmitting characteristics of the red colored layer, the green colored layer, the blue colored layer, and the cyan colored layer are denoted as R, G, B, and C, respectively.

Figure 6:
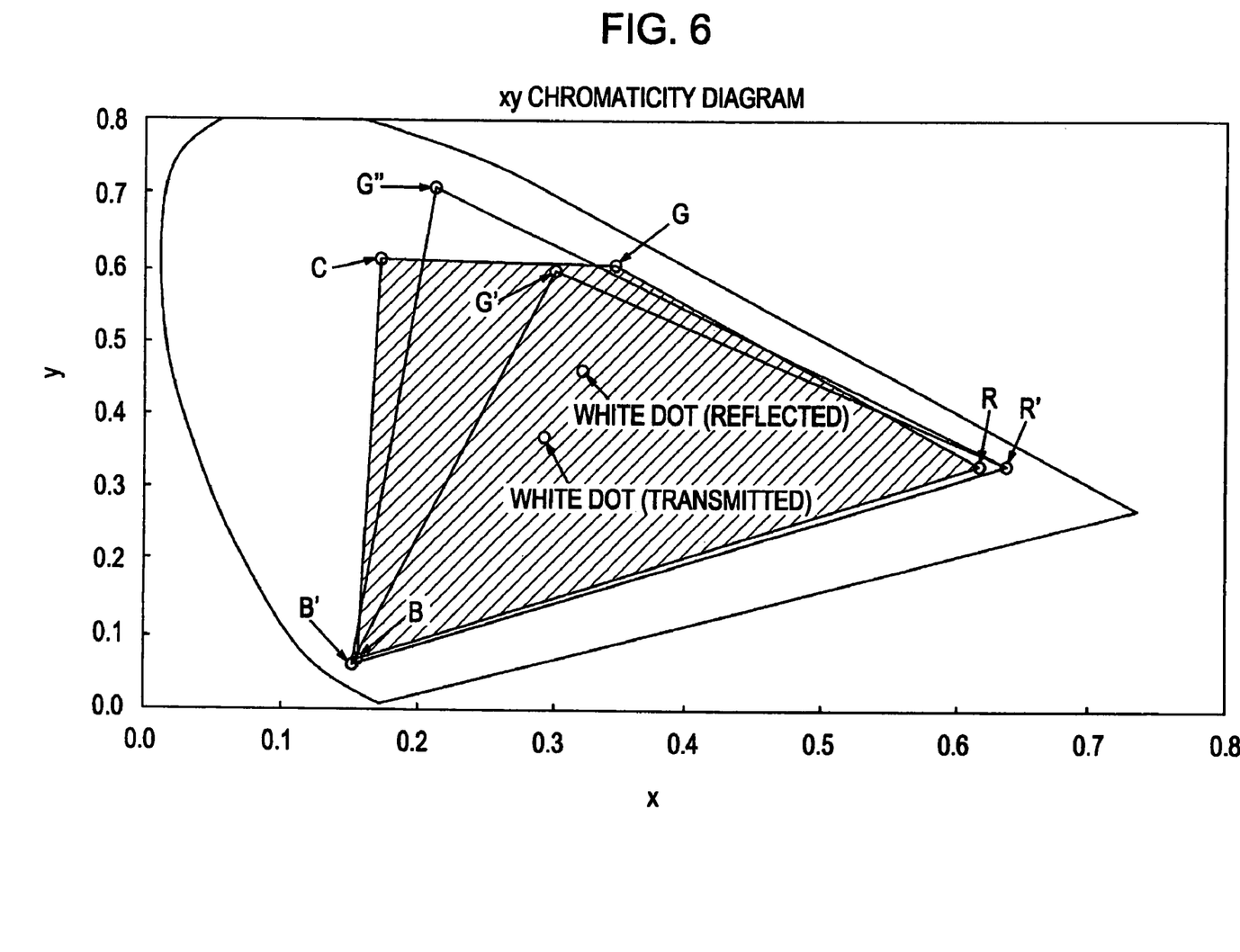
FIG. 6 is a xy chromaticity diagram illustrating hues and a color reproducibility range of colored layers in accordance with the embodiments.

In addition, FIG. 6 is a xy chromaticity diagram of a color reproducibility range implemented by the color filter 122 employed in this embodiment. Referring to the drawing, R, G, B, and C indicate hues of the colored layers of the respective colors shown in FIG. 5. In addition, R', G', and B' indicate desired hues for the red, green, and blue colored layers to be disposed in the light reflecting region Ar, and G" indicates a desired hue for the green colored layer to be disposed in the light transmitting region At. In addition, the curve surrounding the apexes indicates a hue range capable of being perceived by the human' eyes.

Referring to the chromaticity diagram, since the area of the colored quadrangle surrounded by R, G, B, and C in this embodiment is larger than the area of the colored triangle having R', G', and B' as apexes, it can be understood that the color reproducibility range of the transmissive display of this embodiment is larger than the color reproducibility range of the reflective display. In addition, when the transmissive display is performed on the filter structure having the three primary colors of the related art, a large color reproducibility range can be utilized to some extent as shown by the colored triangle of R', G", and B', however, it can be seen that the color reproducibility range of R, G, B, and C of this embodiment can be equal to or larger than the color reproducibility range of the related art.

In accordance with this embodiment, a large color reproducibility range can be utilized on the transmissive display using four colored layers of R, G, B, and C disposed in the light transmitting region At, and bright reflective display can also be utilized using three colored layers of R, G, and B disposed in the light reflecting region Ar and the portion where the colored layer is not disposed. That is, colors can be displayed with four colors which are composed of the three colors and the C (cyan) in the transmissive display even when a structure desired for decreasing the saturations of the three colors of R, G, and B so as to utilize the bright reflective display is employed, such that the color reproducibility of the transmissive display can be suppressed from being degraded.

In addition, in this embodiment, the light reflecting region where the colored layer is not disposed independently exists, so that the brightness of the reflective display can be improved, and the brightness of the reflective display can be controlled independently from the hues. Accordingly, in this embodiment, in order to ensure the brightness of the reflective display, the saturation of the colored layer does not need to be lowered, which results in obtaining the balance between the transmissive display and the reflective display.

In addition, in this case, the saturation of each of the colored layers 122at and 122ar disposed in the light transmitting region At and the light reflecting region Ar does not need to be changed, and thus the number of processes for manufacturing the color filter can be reduced. Accordingly, the manufacturing cost can be suppressed from increasing without requiring the complicated manufacturing process.

The colored layer 122at of the sub-pixel Dxc may be formed using a colorant having another color other than the cyan. However, it is preferable to have a hue increasing the color reproducibility range by adding the color to the three primary colors of R, G, and B. For example, it is preferable that the colored layer has a hue sufficiently separated from the three colors on the chromaticity diagram and also has high saturation to some extent, that is, a hue outside the colored triangle formed by the three colors on the chromaticity diagram. Complementary colors such as Cyan, Magenta, and Yellow are the most preferable colors for the filter colors.

In addition, only one sub-pixel Dxc besides the three sub-pixels is formed within the pixel Px in this embodiment. However, a plurality of additional sub-pixels besides the three sub-pixels may be formed. For example, two sub-pixels such as a sub-pixel Dxc having a cyan colored layer and a sub-pixel Dxm (not shown) having a magenta colored layer may be formed within the pixel Px and each of these sub-pixels may have the same structure as the sub-pixel Dxc described in the embodiment. Accordingly, one pixel Px is formed by five sub-pixels.

In addition, in this embodiment, the colored layer 122at to be disposed in the light transmitting region At and the colored layer 122ar to be disposed in the light reflecting region Ar are simultaneously formed of the same material so as to suppress the manufacturing cost from increasing and improve the color reproducibility of the transmissive display and sufficiently secure the brightness of the reflective display. Therefore, a colored layer having relatively high saturation is disposed over an entire surface of the light transmitting region At while the same colored layer is partially (selectively) disposed in the reflecting region Ar in this embodiment. That is, in the light reflecting region Ar, the colored layer is not disposed, and a region where the reflective layer 116 is exposed is formed. By doing so, the same effect as the case of decreasing the saturation of the colored layer 122ar in the entire light reflecting region Ar is obtained even when the saturation of the colored layer does not significantly decrease. However, the colored layer 122ar may be formed over an entire surface of the light reflecting region Ar in at least one sub-pixel among three sub-pixels.

In this embodiment, three primary colors of red, green, and blue are used as the common filter colors for the transmissive display and reflective display while the complementary color such as a cyan color is simultaneously used as the filter color to be set in the transmissive display so as to improve the color reproducibility. Therefore, the color reproducibility of green colored regions can be increased. Furthermore, a large spectral color difference (i.e., a distance on the chromaticity diagram) between a green color and a cyan color may cause to improve the color reproducibility. For example, referring to FIG. 6, the hue apex G of a green filter color is set to be separated from the cyan hue apex C more than the filter colors G' and G" according to the related art so as to increase the area of the colored triangle. The color reproducibility range can be set to be further increased.

Hereinbefore, it has been described that the colored regions of the sub-pixels Dxr, Dxg, and Dxb correspond to respective R (red), G (green), and B (blue), and the colored region of the sub-pixel Dxc corresponds to C (cyan). However, the invention is not limited thereto but may be modified as follows.

That is, the colored regions having four colors may include colored regions based on a blue hue, colored regions based on a red hue, and colored regions of two kinds of hues selected from blue to yellow hues in the visible light region in which hues are changed in accordance to the wavelengths (380 to 780 nm). In this case, for example, the blue-based hue to be employed is not limited to a pure blue but contains a celadon green or a bluish green. The red based hue may include not only the red color but also the orange color. In addition, the colored regions may include a single colored layer or colored layers having different hues overlapping from each other.

In addition, the colored regions are based on the hues, however, the corresponding hues may be set by properly adjusting the saturation and brightness. A blue based hue of specific hues ranges from a celadon green color to a bluish green color, and, more preferably, ranges from an indigo color to a blue color. A colored region of the red based hue ranges from an orange color to a red color. A colored region of one side selected from hues ranging from a blue color to a yellow color ranges from the blue color to a green color, and, more preferably, ranges from a bluish green color to a green color. A colored region of the other side selected from hues ranging from a blue color to a yellow color ranges from a green color to an orange color, and, more preferably, ranges from a green color to a yellow color. Alternatively, the colored region of the other side selected from hues ranging from a blue color to a yellow color ranges from a green color to a yellowish green color.

Here, each of the colored regions does not use the same hue. For example, when a green based hue is employed in two colored regions selected from the hues ranging from a blue color to a yellow color, the other side employs a blue based or yellowish green based hue with respect to the green color of the one side. Accordingly, wider color reproducibility can be utilized than the colored regions of the RGB of the related art.

When this is applied to the embodiment, for example, a colored region based on a red hue, a colored region based on a blue hue, a colored region of hues ranging from green to orange, and a colored region of hues ranging from blue to green can be disposed in the sub-pixels Dxr, Dxb, Dxg, and Dxc, respectively. Hues of the sub-pixels Dxg and Dxc may be opposite to the above-described case, however, it is preferable to have the hue of the sub-pixel Dxc ranging from blue to green in consideration of the color balance of the display by using the light reflecting region Ar or the range of color reproducibility of the display by using the transmitting region At.

In addition, the wide color reproducibility has been described with respect to hues. However, hereinafter, the color reproducibility will be described with respect to wavelengths which transmit colored regions. The blue based colored region has a wavelength peak in a range of 415 nm to 500 nm of lights which have transmitted the corresponding colored region, and preferably, in a range of 435 nm to 485 nm. The red based colored region has the wavelength peak not less than 600 nm, and preferably, has the wavelength peak not less than 605 nm. The colored region of one side selected from hues ranging from blue to yellow has the wavelength peak in a range of 485 nm to 535 nm, and preferably, in a range of 495 nm to 520 nm. The colored region of the other side selected from the hues ranging from blue to yellow has the wavelength peak in a range of 500 nm to 590 nm, and preferably, in a range of 510 nm to 585 nm or in a range of 530 nm to 565 nm.

Next, the colored regions are indicated in the xy chromaticity diagram. The blue based colored region corresponds to $x \leq 0.151$ and $y \leq 0.056$, and preferably, $0.134 \leq x \leq 0.151$ and $0.034 \leq y \leq 0.056$. The red based colored region corresponds to $0.643 \leq x$ and $y \leq 0.333$, and preferably, $0.643 \leq x \leq 0.690$ and $0.299 \leq y \leq 0.333$. The colored region of one side selected from hues ranging from blue to yellow corresponds to $x \leq 0.164$ and $0.453 \leq y$, and preferably, $0.098 \leq x \leq 0.164$ and $0.453 \leq y \leq 0.759$. The colored region of the other side selected from hues ranging from blue to yellow corresponds to $0.257 \leq x$ and $0.606 \leq y$, and preferably, $0.257 \leq x \leq 0.357$ and $0.606 \leq y \leq 0.670$.

When the transmitting and reflecting regions are disposed in the sub-pixel, such colored regions having four colors of the transmitting and reflecting regions can be applied in the above-described ranges.

A light emitting diode (LED) as a light source of RGB, a fluorescent tube, or an organic EL may be used as a backlight. Alternatively, a white color light source may be used. The white color light source may be one that emits lights by means of a blue emitting substance and a YAG fluorescent substance. Examples of the RGB light source are preferably as follows. B has a wavelength peak in a range of 435 nm to 485 nm, G has a wavelength peak in a range of 520 nm to 545 nm, R has a wavelength peak in a range of 610 nm to 650 nm, and the colored regions can be properly controlled by the wavelengths of the RGB light source to obtain wider color reproducibility. In addition, a light source including, for example, a plurality of wavelength peaks along with a peak in a range of 450 nm to 565 nm may be employed.

Examples of the structures of the colored regions having four colors may be as follows.

(1) colored region having hues of red, blue, green, and cyan (bluish green)

Figure 3:
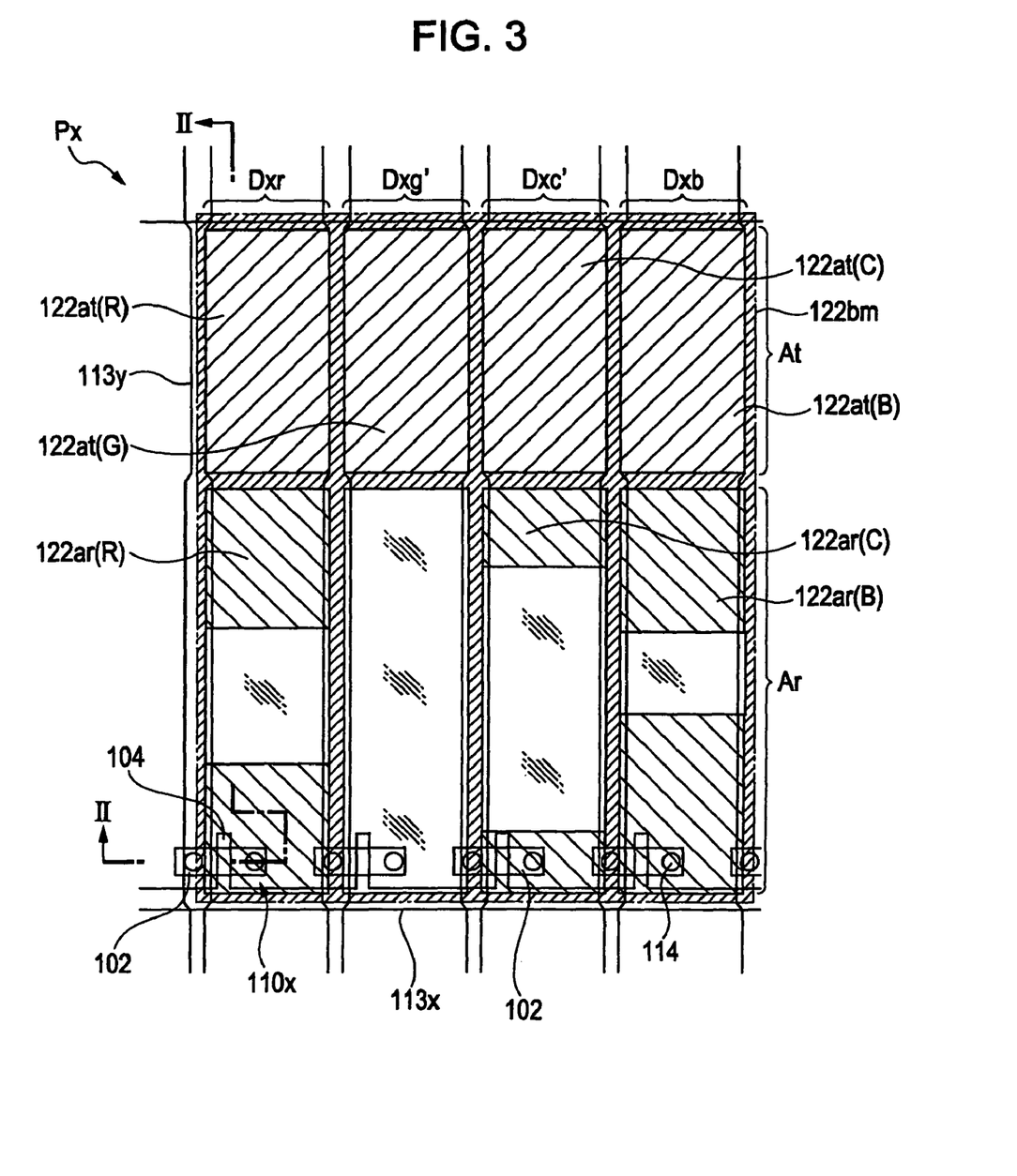
FIG. 3 is a plan view schematically illustrating a structure of one pixel in an electro-optical device according to a second embodiment of the invention.

(2) colored region having hues of red, blue, green, and yellow (3) colored region having hues of red, blue, deep green, and yellow (4) colored region having hues of red, blue, and emerald, and yellow (5) colored region having hues of red, blue, deep green, and yellowish green (6) colored region having hues of red, bluish green, deep green, and yellowish green Second Embodiment Next, another embodiment of the invention will be described with reference to FIG. 3. FIG. 3 is a schematic plan view of a structure of a pixel according to the second embodiment of the invention. In this embodiment, the same numerals are denoted in the same portions as the first embodiment, such that descriptions thereof will be omitted.

In this embodiment, in one pixel Px, the sub-pixels Dxr, Dxc, and DxB are provided. In each of the three kinds of sub-pixels, similar to the first embodiment, the light transmitting region At and the light reflecting region Ar are provided, and the colored layers 122at and 122ar of red (R), cyan (C), and blue (B) are provided in each region.

In the meantime, in another sub-pixel Dxg', the light transmitting region At and the light reflecting region Ar are provided, and the colored layer 122at of green (G) is disposed in the light transmitting region At. However, the colored layer is not disposed in the light reflecting region Ar.

In this embodiment, in the light reflecting region of the sub-pixel Dxc', the colored layer 122ar of cyan is disposed, but the colored layer of green is not disposed in the light reflecting region of the sub-pixel Dxg'.

In this embodiment, the reflective display is performed with three colors of R (red), C (cyan), and B (blue) colors disposed in the reflecting region Ar, which allows color reflective display having sufficiently high quality be utilized. This is because that the reflective display originally has not only a lower luminance or contrast but also lower color reproducibility compared to the transmissive display, and tends to be visible as a green color even in the reflecting region where the colored layer is not disposed.

Third Embodiment

Figure 4:
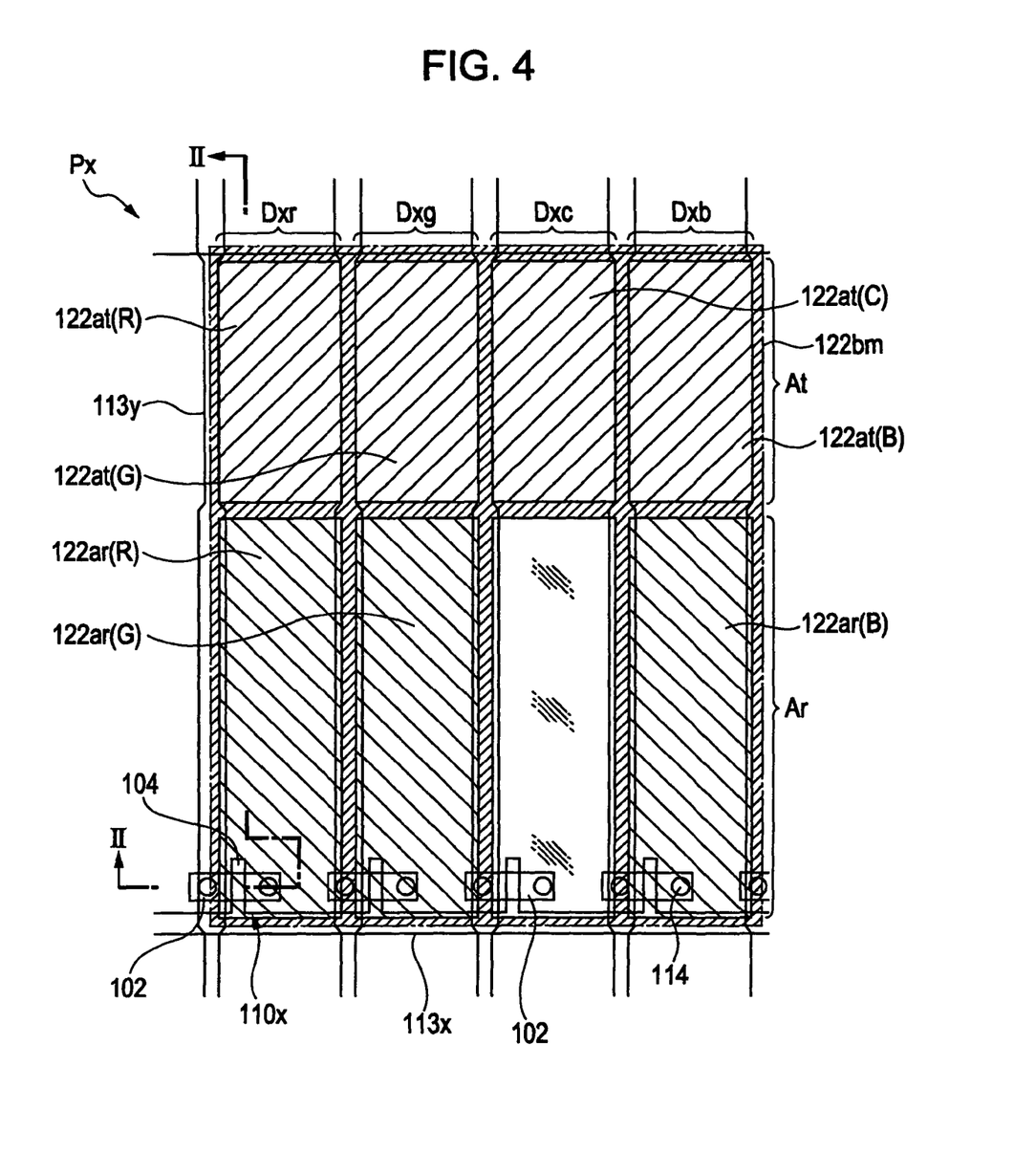
FIG. 4 is a plan view schematically illustrating a structure of one pixel in an electro-optical device according to a third embodiment of the invention.

FIG. 4 is a schematic plan view of a structure of one pixel of an electro-optical device in accordance with another embodiment of the invention. In the third embodiment, the same numerals are also denoted in the same portions as any of the above-described embodiments, such that descriptions thereof will be omitted. This embodiment is the same as the above-described embodiments in that the colored layer is not disposed in the light reflecting region Ar of the sub-pixel Dxc. However, this embodiment is different from the above-described embodiment in that in the light reflecting region Ar that is provided in the sub-pixels Dxr, Dxg, and Dxb, the colored layers 122ar of red (R), green (G), and blue (B) are entirely formed.

As described above, the colored region is disposed in the light reflecting region Ar of the sub-pixel Dxc, and the brightness of the reflective display can be easily obtained. Therefore, it is not substantially necessary that the portion where the colored layer is not provided is provided in the light reflecting regions Ar of the other sub-pixels Dxr, Dxg, and Dxb. Even through the colored layer 122ar is entirely disposed, the sufficient reflective display can be implemented.

In addition, in this embodiment, in the light reflecting region Ar of the sub-pixels Dxr, Dxg, and Dxb that have the colored layers 122ar of three colors for allowing the reflective to perform the color display, the color reproducibility of the reflective display can be improved.

In addition, this embodiment is constructed on the basis of the first embodiment, but may be constructed on the basis of the second embodiment such that red (R), cyan (C), and blue (B) may be disposed on the entire light reflecting region.

Electronic Apparatus

Figure 7:
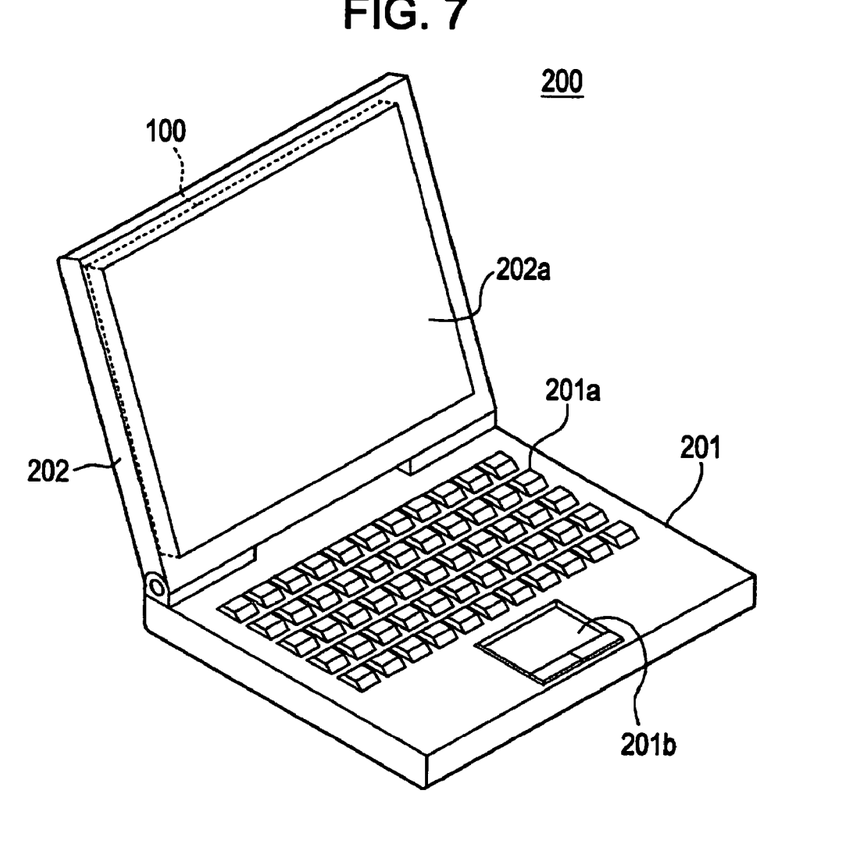
FIG. 7 is a schematic perspective view illustrating an example of an electronic apparatus in accordance with the embodiments.

An embodiment where the electro-optical device according to each of the above-described embodiments is applied to an electronic apparatus will be described. FIG. 7 illustrates a personal notebook computer (PC) in accordance with an embodiment of the electronic apparatus. The PC 200 includes a main body 201 having a plurality of operation buttons 201*a* and other control device 201*b*, and a display 202 connected to the main body 201 and having a display screen 202*a*. In this case, the main body 201 and the display 202 are formed to be opened and closed. The above-described electro-optical device (liquid crystal display) 100 is built in the display 202, and a desired display image is disposed on the display screen 202*a*. In this case, a display control circuit for controlling the electro-optical device 100 is disposed within the PC 200. This display control circuit is formed to transmit a predetermined control signal to a known driver circuit (e.g., a liquid crystal driver circuit or the like) that is disposed in the electro-optical device 10 and is not shown, to determine the display mode.

Figure 8:
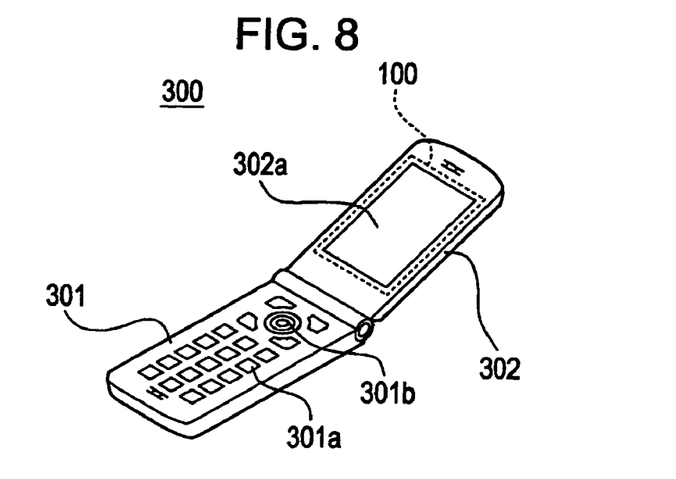
FIG. 8 is a schematic perspective view illustrating another example of an electronic apparatus in accordance with the embodiments.

FIG. 8 illustrates a cellular phone in accordance with another embodiment of the electronic apparatus. The cellular phone 300 includes an operational section 301 having a plurality of operation buttons 301*a* and 301*b* and a sender, and a display 302 having a display screen 302 and a receiver, and has the electro-optical device 100 built in the display 302. A display image formed by the electro-optical device can be perceived on the display screen 302*a* of the display 302. In this case, a display control circuit for controlling the electro-optical device 100 is disposed within the cellular phone 300. This display control circuit is formed to transmit a predetermined control signal to a known driver circuit (e.g., a liquid crystal driver circuit or the like) that is disposed in the electro-optical device 100 and is not shown, and to determine the display mode.

Examples of the electronic apparatus may include, in addition to the electronic apparatuses shown in FIGS. 7 and 8, a liquid crystal TV, a car navigation device, a pager, an electronic note, an electronic calculator, a workstation, a picture phone, a Point of Sale (POS) terminal, and so forth. The electro-optical device of the invention may be applied as displays of such various electronic apparatuses.

In addition, it is obvious that the invention is not limited to the above-described embodiments but may have various modifications within the range of the invention. By way of example, a liquid crystal device having a liquid crystal display panel has been described in this embodiment, however, the invention is not limited to the liquid crystal device but can be applied to other electro-optical devices such as electrophoresis display devices when transmissive and reflective display can be performed using a color filter.

What is claimed is:

1. An electro-optical device, comprising:
a plurality of sub-pixels each of which has a light transmitting region where transmissive display is performed and a light reflecting region where reflective display is performed, colored layers being disposed so as to correspond to the plurality of sub-pixels,
the colored layers having filter colors of a three primary color system and a filter color of a complementary color system other than the three primary color system, and color display being performed in both the reflective display and the transmissive display;
in each of the plurality of sub-pixels, a colored layer of any one of the filter colors of the three primary color system and the filter color of the complementary color system other than the three primary color system being disposed in at least the light transmitting region; and
the colored layer is not provided over any portion of the entire light reflecting region of the sub-pixel in which the filter color of the complementary color system is disposed.

2. The electro-optical device according to claim 1, in each of the plurality of sub-pixels, an area of the light transmitting region of the sub-pixel where the colored layer of the filter color of the three primary color system is disposed being the same as an area of the light transmitting region of the sub-pixel where the colored layer of the filter color of the complementary color system is disposed.

3. The electro-optical device according to claim 1, in each of the plurality of sub-pixels, an area of the light reflecting region of the sub-pixel where the colored layer of the filter color of the three primary color system is disposed being the same as an area of the light reflecting region of the sub-pixel where the colored layer of the filter color of the complementary color system is disposed, in which the colored layer is not provided.

4. The electro-optical device according to claim 1, in each of the plurality of sub-pixels, an area of the sub-pixel where the colored layer of the filter color of the three primary color system is disposed being the same as an area of the sub-pixel where the colored layer of the filter color of the complementary color system is disposed.

5. The electro-optical device according to claim 1, in the sub-pixels where the colored layer of the filter color of the three primary color system is disposed, at least one sub-pixel being included in which a portion where the colored layer is not formed in the light reflecting region of the sub-pixel is provided.

6. The electro-optical device according to claim 1, the filter color of the complementary color system being cyan.

7. An electronic apparatus, comprising:
the electro-optical device according to claim 1; and
a control unit that controls the electro-optical device.

8. An electro-optical device, comprising:
three sub-pixels corresponding to three colors, each of which has a light transmitting region and a light reflecting region, and in which a colored layer of any one of the three colors is disposed in each of the light transmitting region and the light reflecting region;
at least one sub-pixel in which a colored layer of one color other than the three colors is disposed in the light transmitting region, transmissive display is performed in the light transmitting region, reflective display is performed in the light reflecting region; and
the at least one sub-pixel having a light reflecting region and the colored layer is not disposed over any portion of the entire light reflecting region of the at least one sub-pixel.

9. The electro-optical device according to claim 8, the light transmitting regions of the three sub-pixels corresponding to the three colors and the at least one sub-pixel being equal to each other in area.

10. The electro-optical device according to claim 8, the light reflecting regions of the three sub-pixels corresponding to the three colors and the at least one sub-pixel are equal to each other in area.

11. The electro-optical device according to claim 8, the three sub-pixels corresponding to the three colors and at least one sub-pixel being equal to each other in area.

12. The electro-optical device according to claim 8, in at least one of the light reflecting regions of the sub-pixels corresponding to the three colors, a portion being provided in which the colored layer is not provided.

13. The electro-optical device according to claim 8, the three colors are filter colors of a primary color system, and the color other than the three colors being a filter color of a complementary color system.

14. The electro-optical device according to claim 13, wherein the color other than the three colors is cyan.

15. An electro-optical device, comprising:
a plurality of sub-pixels each having a light transmitting region where transmissive display is performed and a light reflecting region where reflective display is performed, colored regions being disposed so as to correspond to the plurality of sub-pixels,
the colored regions having, among a visible light region where hues vary in accordance with a wavelength, a first colored region of a blue hue, a second colored region of a red hue, and third and fourth colored regions each having two kinds of different hues selected from hues from blue to yellow, color display being performed in both the reflective display and the transmissive display;
in each of the plurality of sub-pixels, any one of the first to fourth colored regions being disposed in at least the light transmitting region; and
the colored regions are not provided over any portion of the entire light reflecting region of the sub-pixel in which either the third colored region or the fourth colored region is disposed.

16. The electro-optical device according to claim 15, the third colored region being a colored region of hues from blue to green; and the fourth colored region being a colored region of hues from green to orange.

17. The electro-optical device according to claim 15, in each of the plurality of sub-pixels, an area of the light transmitting region of each of the sub-pixels where the first colored region, the second colored region, and one of the third colored layer and the fourth colored layer are disposed being the same as an area of the light transmitting region of the sub-pixel where the other of the third colored region and the fourth colored region is disposed.

18. The electro-optical device according to claim 15, in each of the plurality of sub-pixels, an area of the light reflecting region of each of the sub-pixels where the first colored region, the second colored region, and one of the third colored region and the fourth colored region are disposed being the same as an area of the light reflecting region of the sub-pixel where the other of the third colored region and the fourth colored region is disposed, in which the colored region is not provided.

19. The electro-optical device according to claim 15, in each of the plurality of sub-pixels, an area of each of the sub-pixels where the first colored layer, the second colored layer, and one of the third colored layer and the fourth colored layer are disposed being the same as an area of the sub-pixel where the other of the third colored region and the fourth colored region is disposed.

20. The electro-optical device according to claim 15, in the light reflecting regions of the sub-pixels where the first colored region, the second colored region, and one of the third colored region and the fourth colored region are disposed, at least one sub-pixel being included in which a portion where the colored region is not formed is provided.

21. An electro-optical device, comprising:
a plurality of sub-pixels each having a light transmitting region where transmissive display is performed and a light reflecting region where reflective display is performed, colored regions being disposed so as to correspond to the plurality of sub-pixels,
the colored regions having a first colored region in which a first peak of a wavelength of light transmitted through the corresponding colored region is within a range of 415 to 500 nm, a second colored region in which a second peak of a wavelength of light transmitted through the corresponding colored region is 600 nm or more, a third colored region in which a third peak of a wavelength of light transmitted through the corresponding colored region is within a range of 485 to 535 nm, and a fourth colored region in which a fourth peak of a wavelength of light transmitted through the corresponding colored region is within a range of 500 to 590 nm, color display being performed in both the reflective display and the transmissive display;
in each of the plurality of sub-pixels, any one of the first to fourth colored regions being disposed in at least the light transmitting region; and
the colored regions are not provided over any portion of the entire light reflecting region of the sub-pixel in which either the third colored region or the fourth colored region is disposed.

22. The electro-optical device according to claim 21, the third colored region being a colored region in which the third peak of a wavelength of light transmitted through the corresponding colored region is within a range of 495 to 520 nm; and the fourth colored region is a colored region in which the fourth peak of a wavelength of light transmitted through the corresponding colored region is within a range of 510 to 585 nm.

23. An electro-optical device, comprising:
three sub-pixels corresponding to three colors each of which has a light transmitting region and a light reflecting region, and in which a colored layer of any one of the three colors is disposed in each of the light transmitting region and the light reflecting region;
at least one sub-pixel in which a colored layer of one color other than the three colors is disposed in the light transmitting region, transmissive display being performed in the light transmitting region, reflective display being performed in the light reflecting region; and
the at least one sub-pixel having a light reflecting region and the colored layer is not disposed over any portion of the entire light reflecting region of the at least one sub-pixel.

24. The electro-optical device according to claim 23, the light transmitting regions of the three sub-pixels corresponding to the three colors and the at least one sub-pixel being equal to each other in area.

25. The electro-optical device according to claim 23, the light reflecting regions of the three sub-pixels corresponding to the three colors and the at least one sub-pixel being equal to each other in area.

26. The electro-optical device according to claim 23, the three sub-pixels corresponding to the three colors and the at least one sub-pixel being equal to each other in area.

27. The electro-optical device according to claim 23, in at least one of the light transmitting regions of the three sub-pixels corresponding to the three colors, a portion being provided in which the colored layer is not provided.

28. The electro-optical device according to claim 23, the colored regions corresponding to the three colors being among a visible light region where hues vary in accordance with a wavelength, a colored region of a blue hue, a colored region of a red hue, and one of colored regions of two kinds of different hues selected from hues from blue to yellow; and the colored region corresponding to the color other than the three colors being the other of the colored regions of two kinds of different hues selected from hues from blue to yellow.

29. The electro-optical device according to claim 28, the colored regions of the two kinds of different hues selected from the hues from blue to yellow being respectively a colored region of hues from blue to green and a colored region of hues from green to orange.

30. The electro-optical device according to claim 23, the colored regions corresponding to the three colors are a first colored region in which a first peak of a wavelength of light transmitted through the colored region is within a range of 415 to 500 nm, a second colored region in which a second peak of a wavelength of light transmitted through the colored region is 600 nm or more, and one of a third colored region in which a third peak of a wavelength of light transmitted through the colored region is within a range of 485 to 535 nm and a fourth colored region in which a fourth peak of a wavelength of light transmitted through the colored region is within a range of 500 to 590 nm; and the colored region corresponding to the color other than the three colors is the other of the third colored region and the fourth colored region.

31. The electro-optical device according to claim 30, the third colored region being a colored region in which the third peak of a wavelength of light transmitted through the colored region is within a range of 495 to 520 nm; and the fourth colored region being a colored region in which a fourth peak of a wavelength of light transmitted through the colored region is within a range of 510 to 585 nm.

* * * * *